United States Patent
Hans et al.

(10) Patent No.: US 9,736,096 B2
(45) Date of Patent: *Aug. 15, 2017

(54) TRANSMISSION FRAME AND RADIO UNIT WITH TRANSMISSION FRAME

(71) Applicant: IPCOM GMBH & CO. KG, Pullach (DE)

(72) Inventors: Martin Hans, Bad Salzdetfurth (DE); Frank Kowalewski, Göttingen (DE); Holger Schulz, Berlin (DE); Ralf Fischer, Diekholzen (DE); Gunnar Schmidt, Bliesdorf (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,448

(22) Filed: May 4, 2016

(65) Prior Publication Data

US 2016/0294747 A1   Oct. 6, 2016

Related U.S. Application Data

(60) Continuation of application No. 13/556,888, filed on Jul. 24, 2012, now Pat. No. 9,344,863, which is a
(Continued)

(30) Foreign Application Priority Data

Dec. 8, 1998   (DE) .................................. 198 56 440

(51) Int. Cl.
*H04L 12/58* (2006.01)
*H04W 4/12* (2009.01)
(Continued)

(52) U.S. Cl.
CPC ............ *H04L 51/063* (2013.01); *H04L 51/10* (2013.01); *H04W 4/12* (2013.01); *H04W 4/14* (2013.01); *H04W 4/20* (2013.01); *H04W 4/18* (2013.01)

(58) Field of Classification Search
CPC ......... H04W 4/14; H04W 4/12; H04W 12/06; H04W 4/005; H04L 12/5895; H04L 51/38; H04L 51/32; H04L 51/04
See application file for complete search history.

(56) References Cited

U.S. PATENT DOCUMENTS

| 4,774,706 A | 9/1988 | Adams |
| 4,864,532 A | 9/1989 | Reeve et al. |

(Continued)

FOREIGN PATENT DOCUMENTS

| DE | 19856440 C2 | 6/2000 |
| EP | 0689368 A1 | 12/1995 |

(Continued)

OTHER PUBLICATIONS

US 7,187,937, 03/2007, Helferich (withdrawn)
(Continued)

*Primary Examiner* — Jung Park
(74) *Attorney, Agent, or Firm* — Nelson Mullins Riley & Scarborough LLP

(57) ABSTRACT

For transmitting messages in a radiotelecommunications network from a first subscriber station, a transmission frame at least two data fields with data in a first data format transmitted in a first data field of the short message, and data in a second data format, different from the first data format, are transmitted in a second data field of the short message, a first identification code, which identifies a makeup of the short message, is transmitted in the first data field and includes information about at least one of a number of data (Continued)

fields, one or more data formats of data in the data fields, and a size of the data fields, and in each of two data fields, one data-field-specific identification code, which identifies a makeup and content of the corresponding data field, per data field is transmitted.

11 Claims, 1 Drawing Sheet

Related U.S. Application Data continuation of application No. 12/512,452, filed on Jul. 30, 2009, now Pat. No. 8,243,654, which is a continuation of application No. 11/283,590, filed on Nov. 17, 2005, now Pat. No. 7,586,870, which is a division of application No. 09/857,805, filed as application No. PCT/DE99/03328 on Oct. 16, 1999, now Pat. No. 6,987,980.

(51) Int. Cl.
  *H04W 4/14* (2009.01)
  *H04W 4/20* (2009.01)
  *H04W 4/18* (2009.01)

(56) References Cited

U.S. PATENT DOCUMENTS

| | | | |
|---|---|---|---|
| 5,351,235 A | 9/1994 | Lahtinen | |
| 5,379,292 A | 1/1995 | Kurata et al. | |
| 5,412,719 A | 5/1995 | Hamamoto et al. | |
| 5,604,921 A | 2/1997 | Alanara | |
| 5,630,060 A | 5/1997 | Tang et al. | |
| 5,652,783 A | 7/1997 | Keba et al. | |
| 5,734,645 A | 3/1998 | Raith et al. | |
| 5,793,756 A | 8/1998 | Ayerst et al. | |
| 5,794,142 A | 8/1998 | Vanttila et al. | |
| 5,802,314 A | 9/1998 | Tullis et al. | |
| 5,870,549 A | 2/1999 | Bobo, II | |
| 5,896,376 A | 4/1999 | Alperovich et al. | |
| 6,055,442 A | 4/2000 | Dietrich | |
| 6,085,072 A | 7/2000 | Komiya | |
| 6,085,099 A | 7/2000 | Ritter et al. | |
| 6,094,587 A | 7/2000 | Armanto et al. | |
| 6,151,507 A | 11/2000 | Laiho et al. | |
| 6,188,909 B1 | 2/2001 | Alanara et al. | |
| 6,205,330 B1 | 3/2001 | Winbladh | |
| 6,212,176 B1 | 4/2001 | Andersson et al. | |
| 6,216,014 B1 | 4/2001 | Proust et al. | |
| 6,292,668 B1 | 9/2001 | Alanara et al. | |
| 6,301,484 B1 | 10/2001 | Rogers et al. | |
| 6,333,973 B1 | 12/2001 | Smith et al. | |
| 6,400,942 B1 | 6/2002 | Hansson et al. | |
| 6,400,958 B1 | 6/2002 | Isomursu et al. | |
| 6,405,030 B1 | 6/2002 | Suprunov | |
| 6,421,527 B1 | 7/2002 | DeMartin et al. | |
| 6,470,181 B1 * | 10/2002 | Maxwell | H04L 12/589 379/67.1 |
| 6,529,717 B1 | 3/2003 | Blants et al. | |
| 6,543,686 B1 | 4/2003 | Ritter | |
| 6,556,586 B1 | 4/2003 | Sipila | |
| 6,665,531 B1 | 12/2003 | Soderbacka et al. | |
| 6,781,972 B1 | 8/2004 | Anderlind et al. | |
| 6,977,921 B1 | 12/2005 | Dolan | |
| 6,987,680 B2 | 1/2006 | Vire et al. | |
| 6,987,980 B1 | 1/2006 | Hans et al. | |
| 7,586,870 B2 | 9/2009 | Hans et al. | |
| 8,243,654 B2 | 8/2012 | Hans et al. | |
| 9,344,863 B2 | 5/2016 | Hans | |
| 2006/0135186 A1 | 6/2006 | Hans et al. | |
| 2009/0291698 A1 | 11/2009 | Hans et al. | |

FOREIGN PATENT DOCUMENTS

| | | |
|---|---|---|
| EP | 0777394 A1 | 6/1997 |
| EP | 1138162 B1 | 10/2001 |
| EP | 1138163 B1 | 10/2001 |
| JP | 63-178634 | 7/1988 |
| JP | 10-65655 | 3/1998 |
| JP | 10-126523 | 5/1998 |
| JP | 10-215321 | 8/1998 |
| JP | 10-276414 | 10/1998 |
| JP | 10-326235 | 12/1998 |
| WO | 97/08906 A1 | 3/1997 |
| WO | 97/16890 A2 | 5/1997 |
| WO | 97/16919 A2 | 5/1997 |
| WO | 97/26765 A1 | 7/1997 |
| WO | 97/32439 A2 | 9/1997 |
| WO | 97/50037 A1 | 12/1997 |
| WO | 98/02005 A1 | 1/1998 |
| WO | 98/03005 A1 | 1/1998 |
| WO | 98/09463 A2 | 3/1998 |
| WO | 98/32089 A2 | 7/1998 |
| WO | 98/34422 A2 | 8/1998 |
| WO | 00/35214 A1 | 6/2000 |
| WO | 00/35213 A1 | 7/2000 |
| WO | 01/45320 A2 | 7/2001 |

OTHER PUBLICATIONS

MMS Conformance Document, Version 2.0.0 (2002).
Myers, J. et al., "Post Office Protocol—Version 3," Network Working Group, (1996).
Nokia Corporation, "Decision and Translation of the Decision of the 5th Senate (Nullity Senate) of the German Federal patent Court," re: EP1138163, Case No. 5 Ni 31/09 (EU) (2009).
Nokia Mobile Phones Ltd., "Smart Messaging Specification," Revision 1.0.0 (1997).
Nokia, "Bedienungsanleitung," Electronic user's guide (1998).
Nokia, "ETSI STC SMG1+SMG4+SMG12 MultimediaTdoc," (1998).
Nokia, "Multimedia Messaging Service (MMS)," SMG12 (1998).
Nokia, "Multimedia Messaging Service (MMS)," SMG12, Tdoc98S565, EP1138163 Exhibit K18 (1998).
Nokia, "Multimedia Messaging: needs for standardisation," ETSI STC SMG1+SMG4+SMG12 MultimediaTdoc, (1998).
Nokia, "Nokia introduces the new Nokia 9000i Communicator for GSM Markets," Press Release, 2 pages (1997).
Nokia, "Quick Guide to Remote MsMail," (1996).
Nokia, "User's Manual," Nokia 9000i Communicator, 9357109 Issue 2 EN (1998).
Obst, Wolfgang, "Preisliste Handys," (1998).
Palme, J. et al., "RFC2110—MIME E-mail Encapsulation of Aggregate Documents, suc," retrieved online at http://www.faqs.org/rfcs/rfc2110.html (1997).
Patel, Ahmed et al., "A technique for multi-network access to multimedia messages," Computer Communications, vol. 20:324-337 (1997).
Pine Information Center, "Attachments to Email Messages," retrieved online at: http://www.washington.edu/pine/faq/attachments.html (2002).
Pine Information Center, "Changes from Pine 4.03 to 4.04," retrieved online at: http://www.washington.edu/pine/changes/4.03-to-4.04.html (1998).
Rein, Lisa, "Handling Binary Data in XML Documents," retrieved online at: http://www.xml.com/pub/a/98/07/binary/binary.html (1998).
Tanenbaum, Andrew S., "SNMP—Simple Network Management Protocol," Prentice-Hall, Inc., Computer Networks, Third Edition, pp. 643-663 (1996).
TS 100 539 V6.0.0, "Digital cellular telecommunications system (Phase 2+); Technical realization of facsimile group 3 non-transparent (GSM 03.46 version 6.0.0 Release 1997)," ETSI, (1999).
TS 100 905 V6.0.0, "Digital cellular telecommunications system (Phase 2+); Teleservices supported by a GSM Public Land Mobile

(56) References Cited

OTHER PUBLICATIONS

Network (PLMN) (GSM 02.03 version 6.0.0 Release 1997)," ETSI, GSM: Global System for Mobile Communications, (1999).
TS 100 942 V6.0.1, "Digital cellular telecommunications system (Phase 2+); Point-to-Point (PP) Short Message Service (SMS) support on mobile radio interface (GSM 04.11 version 6.0.1 Release 1997)." ETSI, GSM: Global System for Mobile Communications (1998).
Von Röll, Freiherr, "Frachtbrief," Enzyklopädie des Eisenbahnwesens, pp. 118-121 (1914).
W3C®, "Synchronized Multimedia Integration Language (SMIL) 1.0 Specification," retrieved online at: http://www.w3.org/TR/REC-smil/ (1998).
WAP WSP, "Wireless Application Protocol, Wireless Session Protocol Specification," Version 30, pp. 84(95)-91(95) (1998).
WayBackMachine, http://www.xml.com/xml/pub/98/07/binary/binary.html (2009).
Woo, Thomas Y.C. et al., "Providing Internet Services to Mobile Phones: A case study with Email," The Ninth IEEE International Symposium on Personal, Indoor and Mobile Radio Communications, vol. 1:99-105 (1998).
3G TS 23.040 V3.3.0, "3rd Generation Partnership Project; Technical Specification Group Terminals; Technical realization of the short Message Service (SMS)," 3GPP (1999).
3GPP TS 03.40 V7.5.0, "3rd Generation Partnership Project; Technical Specification Group Terminals; Technical realization of the Short Message Service (SMS)," GSM: Global Systems for Mobile Communications (2001).
3GPP TS 22.140 V5.4.0, "3rd Generation Partnership Project; Technical Specification Group Services and System Aspects; Multimedia Messaging Service (MMS); Stage 1 (Release 5)," 3GPP (2002).
3GPP TS 22.140 V8.0.0, "3rd Generation Partnership Project; Technical Specification Group Services and System Aspects; Multimedia Messaging Service (MMS); Stage 1 (Release 8)," Lte, (2008).
3GPP TS 23.140 V5.11.0, "3rd Generation Partnership Project; Technical Specificaion Group Terminals; Multimedia Messaging Service (MMS); Functional description; Stage 2 (Release 5)," GSM: Global System for Mobile Communications, (2004).
3GPP TS 23.140 V6.16.0, "3rd Generation Partnership Project; Technical Specification Group Core Network and Terminals; Multimedia Messaging Service (MMS); Functional description; Stage 2 (Release 6)," GSM: Global System for Mobile Communications, (2009).
3GPP TS 24.011 V8.2.0, "3rd Generation Partnership Project; Technical Specification Group Core Network and Terminals; Point-to-Point (PP) Short Message Service (SMS) support on mobile radio interface (Release 8)," Lte, (2009).
3GPP TS 26.140 V5.2.0, "3rd Generation Partnership Project; Technical Specification Group Services and System Aspects; Multimedia Messaging Service (MMS); Media formats and codecs (Release 5)," GSM: Global System for Mobile Communications, (2002).
Betanov, Cemil, "Introduction to X.400," Artech House, Inc., Boston, pp. 9-11, 16-25, 120-121, 124-127 (1993).
Borenstein, N. et al., "MIME (Multipurpose Internet Mail Extensions) Part One: Mechanisms for Specifying and Describing the Format of Internet Message Bodies," Network Working Group, (1993).
Bosch, "Generalised Structure for a Multimedia Messaging Service," ETSI STC SMG1+SMG4+SMG12 Multimedia Tdoc (1998).
Collesei, S. et al., "Short Message Service Based Applications in teh GSM Network," 5th IEEE International Symposium on Personal, Indoor and Mobile Radio Communications, vol. 3:939-943 (1994).
Courau, Francois, ETSI PT SMG, The Second Minutes SMG12 Aug. 10-14 (1998).
Crispin, M., "Internet Message Access Protocol—Version 4rev1," Network Working Group (1996).
Crocker, David H., "Standard for the Format of ARPA Internet Text Messages," Dept. of Electrical Engineering, University of Delaware, Obsoletes: RFC #733 (NIC #41952) (1982).
Dokko, Seh-Joon et al., "Development of Multimedia E-mail System Providing an Integrated Message View," Proceedings of the High-Performance Computing on the Information Superhighway, HPC-Asia '97, pp. 494-498 (1997).
EN 300 931 V6.0.1, "Digital cellular telecommunications system (Phase 2+); Technical realization of facsimile group 3 transparent (GSM 03.45 version 6.0.1 Release 1997)," ETSI, GSM: Global System for Mobile Communications (1999).
ETSI Directives, "Annex 6: ETSI Intellectual Property Rights Policy," pp. 38-42 (1997).
ETSI IPR Policy, "Annex 6: ETSI Intellectual Property Rights Policy," Extracted from the ETSI Rules of Procedure (2000).
ETSI PT12, "Technical Realization of Facsimile Group 3—Non-Transparent," GSM 03.46—version 3.2.1 (1993).
ETSI PT12, "Technical Realization of FAX Group 3—Transparant," GSM 03.45—version 3.3.0 (1993).
ETSI PT12, "Technical Realization of the Short Message Service—Point-to-Point," GSM 03.40—version 3.4.0-1 (1990).
ETSI STC Multimedia Tech Doc, "Generalised Structure for a Multimedia Messaging Service," Dec. 2, 2 pages (1998).
ETSI TS 123 040 V4.6.0, "Digital cellular telecommunications system (Phase 2+) (GSM); Universal Mobile Telecommunications System (UMTS); Technical realization of the Short Message Service (SMS) (3GPP TS 23.040 version 4.6.0 Release 4)," GSM Global System for Mobile Communications, (2002).
ETSI, "Digital cellular telecommunications system (Phase 2); Technical realization of the Short Message Service (SMS) Point-to-Point (PP) (GSM 03.40)," GSM: Global System for Mobile Communications, Draft prETS 300 536, Fourth Edition (1996).
ETSI, "Digital cellular telecommunications system (Phase 2+); Technical realization of facsimile group 3 transparent (GSM 03.45 version 5.2.1)," GSM: Global System for Mobile Communications, ETS 300 931, Third Edition (1998).
ETSI, "Digital cellular telecommunications system (Phase 2+); Teleservices supported by a GSM Public Land Mobile Network (PLMN); (GSM 02.03 version 5.3.2)," GSM: Global System for Mobile Communiications, ETS 300 905, Third Edition (1998).
ETSI, "Digital cellular telecommunications system; Technical realization of facsimile group 3 non-tarnsparent (GSM 03.46)," GSM: Global System for Mobile Communications, 03.46, Version 5.0.0 (1996).
ETSI, "ETSI IPR Policy,"ETSI Rules of Procedure, Annex 6 (2000).
ETSI, "European digital cellular communications system (Phase 2); Technical realization of facsimile group 3 non-transparent (GSM 03.46)," ETS 300 539 (1995).
ETSI, "European digital cellular telecommunications system (Phase 2); Technical realization of facsimile group 3 transparent (GSM 03.45)," ETS 300 538, Second Edition (1995).
ETSI, "European digital cellular telecommunications system (Phase 2); Teleservices supported by a GSM Public Land Mobile Network (PLMN) (GSM 02.03)," ETS 300 502 (1994).
ETSI, "Release Note, Recommendation GSM 02.03, Teleservices supported by a GSM PLMN," (1992).
ETSI, "Special Mobile Group, Draft Report #1.1," ETSI/STC SMG1, SMG4, SMG12 Joint MultiMedia Adhoc, pp. 3/9-10/9 (1998).
ETSI, "Statement of Jarkko Sevanto," ETSI meeting in Hanover, Germany (1998).
ETSI/PT12, "Update Note, Recommendation GSM 03.40, Technical Realization of the SMS Point-to-Point," (1994).
European Office Action for Application No. 99938192.4, dated Oct. 31, 2006.
European Office Action for Application No. 99959215.7, dated May 11, 2006.
Freed, N. et al., "Multipurpose Internet Mail Extensions (MIME) Part One: Format of Internet Message Bodies," Network Working Group (1996).
Freed, N. et al., "Multipurpose Internet Mail Extensions (MIME) Part Two: Media Types," Network Working Group, (1996).

(56) References Cited

OTHER PUBLICATIONS

Global System for Mobile Communications, "Digital cellular telecommunications system (Phase 2+); Technical realization of the Short Message Service (SMS); Point-to-Point (PP) (GSM 03.40 version 6.1.0 Release 1997)," ETSI, TS 100 901 V6.1.0 (1998).
Google Groups, "nokia 9000i," retrieved online at http://www.google.de/groups?q=nokia+9000i (2005).
Henning, Peter A., "Taschenbuch Multimedia," Fachbuchverlag Leipzig, pp. 5, 102-105, 212-213 (2003).
Hess, Christopher K. et al., "VistaMail: An Integrated Multimedia Mailing System," IEEE Multimedia, vol. 5(4):13-22 (1998).
International Telecommunication Union, "Series X: Data Networks and Open System Communication," ITU-T Recommendation X.420 (1996).
Internet Archive, "Frequently Asked Questions," retrieved online at: http://www.archive/org/legal/faq.php (2009).
John@college.edu, "MIME Version 1.0," 1 page, email.
Keller, Joerg, "Test," email (2003).
Koerner, Marianne, "MIME-Version: 1.0," e-mail (1998).
LG, "G7050 User Guide," Nokia 90001 Communicator (1995-1997).

\* cited by examiner

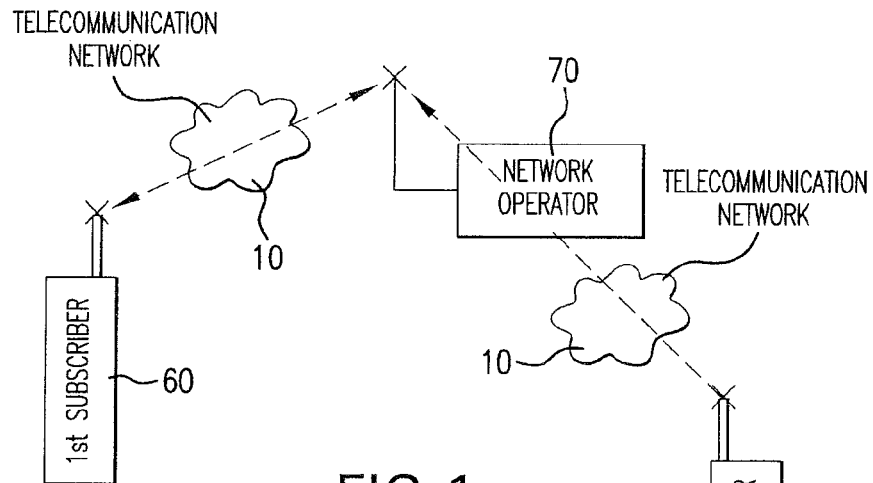
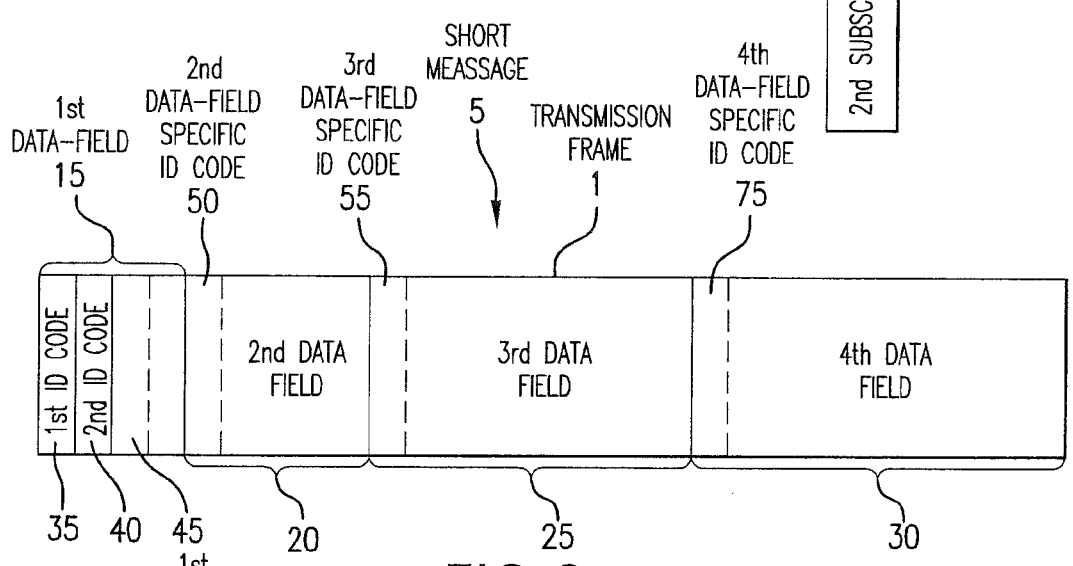
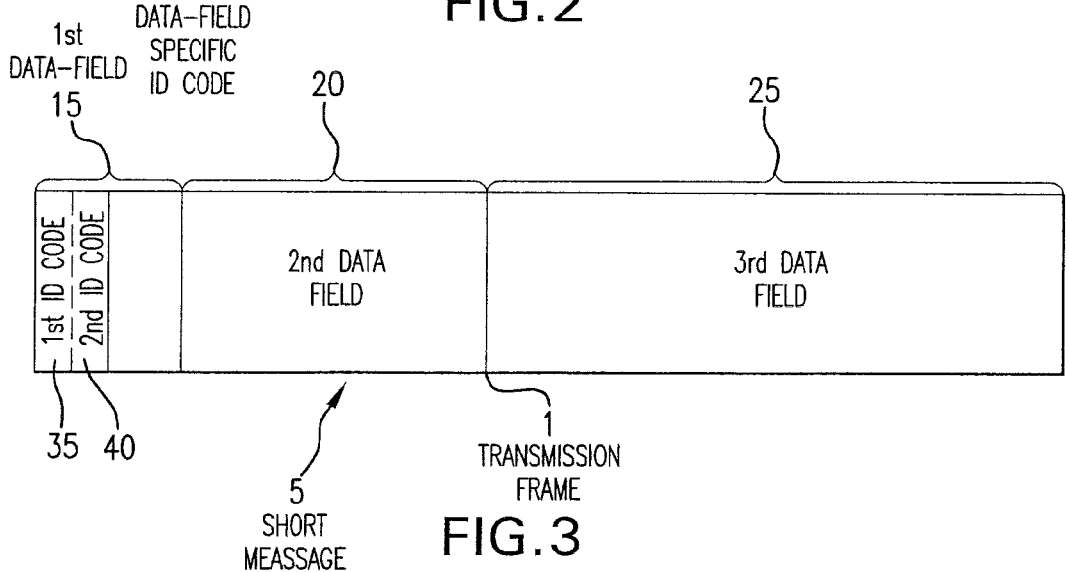

TRANSMISSION FRAME AND RADIO UNIT WITH TRANSMISSION FRAME

CROSS REFERENCE TO RELATED APPLICATIONS

This application is a continuation of U.S. application Ser. No. 13/556,888, filed on Jul. 24, 2012, now U.S. Pat. No. 9,344,863, which is a continuation of U.S. application Ser. No. 12/512,452, filed on Jul. 30, 2009, now U.S. Pat. No. 8,243,654, which is a continuation of U.S. application Ser. No. 11/283,590, filed on Nov. 17, 2005, now U.S. Pat. No. 7,586,870, which is a divisional of U.S. application Ser. No. 09/857,805, filed on Jun. 11, 2001, now U.S. Pat. No. 6,987,980, which is a 35 U.S.C. 371 national stage filing of International Application No. PCT/DE1999/003328, filed Oct. 16, 1999, which claims priority to German Application No. 19856440.6, filed on Dec. 8, 1998. These applications are incorporated herein by reference in their entirety.

The invention described and claimed hereinbelow is also described in the patent application 198 56 4406 filed on Dec. 8, 1998. This Germany Patent Application, whose subject matter is incorporated here by reference, provides the basis for a claim of priority of invention under 35 U.S.C. 119(a)-(d).

BACKGROUND OF THE INVENTION

The present invention relates to a transmission frame and a telecommunications device having the transmission frame.

Short message services for transmitting short messages are already known. The short message services serve to send a short message to a subscriber of a telecommunications network without requiring that a telecommunications connection to the subscriber be made beforehand. This is of particular interest in mobile radio systems, since subscribers in such systems are often unreachable. Incoming short messages are stored in memory by a network operator of the telecommunications network and forwarded to the intended subscriber at a later time. The subscriber is informed of the arrival of a short message intended for him so that he can download the short message from the network operator.

One example of a short message service is the Short Message Service (SMS) using the GSM standard (Global System for Mobile Communications). This short message service predetermines a transmission frame for transmitting a short message of up to 160 7-bit ASCII (American Standard Code for Information Interchange) text characters.

Transmitting longer texts is possible with the aid of chained short messages. With the aid of this short message service, it is possible to produce and read the short messages even using simple mobile radio terminals. Since by the GSM Standard provision is made only for text transmission for the short messages, if binary data, such as audio data, image data or the like, are to be transmitted, they would have to be converted into the text format and converted back again into the binary format after being received.

SUMMARY OF THE INVENTION

The transmission frame of the invention and the telecommunications device of the invention have the advantage over the prior art that at least two data fields are provided; that data of a short message are stored in memory in the data fields; and that data in a first data format are stored in a first data field, and data in a second data format, different from the first data format, are stored in a second data field. In this way, a short message that includes different types of data can be transmitted in a single transmission frame. Thus different media, such as text data, audio data and image data, can be integrated into a single short message in a simple way, making it possible to form a multimedia short message.

A further advantage is that the transmission frame is not limited in its length; instead, arbitrary data fields can be determined, lined up with one another, in the transmission frame.

Another advantage is that by lining up the data fields, a simple separation or downloading of the data of a single data field or medium having text, audio, or image data is made possible. Since thus only the actually required part of the short message has to be downloaded by the network operator of the telecommunications network, an economy of transmission capacity can be achieved.

It is especially advantageous that a first ID code, which identifies the make-up and/or the content of the short message, is provided in the first data field. In this way, a subscriber to whom the short message is addressed can be informed especially easily of the makeup and/or content of the short message if the network operator of the telecommunications network transits merely the first data field to the intended subscriber. Based on this information, the intended subscriber can then decide which parts of the data fields of the short message he would like to download from the network operator of the telecommunications network.

Another advantage is that the first data field is limited in its size to a predetermined value. Thus even a subscriber with limited storage capacity of or receiving short messages can be informed of the makeup and/or content of the entire short message by transmission of the first data field.

Another advantage is that the total length of the short message is not limited.

It is also advantageous that in each of at least two data fields, one data-field-specific ID code, which identifies the makeup and/or content of the corresponding data field, is provided per data field. In this way, a notice about the makeup and/or content of the entire short message can also be generated by combining all the data-field-specific ID codes and sending them to the intended subscriber, so that the first data field, above all in the case of a size limitation, will not be overfilled with ID code data.

By means of the data-field-specific ID code, the intended subscriber on downloading the associated data field from the network operator can be informed still more precisely about this data field and can thus better adapt a playback of the data transmitted with the data field to his own playback capabilities.

It is especially advantageous that the data stored in the first data field are present in a data format that is readable by all the subscribers of the telecommunications network. In this way, short messages can be sent at least in part to all the subscribers of the telecommunications network. Furthermore, all the subscribers can at least be informed of the short messages on hand in the network operator, even if they are unable to read certain data fields of the short message intended for them.

BRIEF DESCRIPTION OF THE DRAWINGS

One exemplary embodiment of the present invention is shown in the drawing and described in further detail in the ensuing description.

FIG. 1 shows a block circuit diagram for transmitting short messages in a telecommunications network;

FIG. 2 shows a general makeup of a transmission frame; and

FIG. 3 shows one concrete example of a makeup of a transmission frame.

DESCRIPTION OF THE PREFERRED EMBODIMENTS

In FIG. 1, 60 designates a first subscriber and 65 a second subscriber of a telecommunications network 10, which is embodied in particular as a radiotelecommunications network, for example s a mobile radio network. The first subscriber 60 and the second subscriber 65 are each embodied as a telecommunications device, in particular as a radio unit, for example as a mobile radio device, service radio device, as a radio handset, or the like. In FIG. 1, a network operator 70 of the telecommunications network 10 is also shown; it can also be embodied as a telecommunications device, and in particular as a radio unit.

In the second subscriber 65, a short message 5 for the first subscriber 60 is prepared and is broadcast, suitably addressed, to the network operator 70 via the telecommunications network 10. The network operator 70 stores the short message 5 in memory and sends a message to the first subscriber 60 informing the subscriber about the presence of a short message 5 addressed to it. This message can be sent to the first subscriber 60 for example once the network operator 70 ascertains an activation of the first subscriber 60. If after receiving the aforementioned message the first subscriber 60 asks the network operator 70 to transmit the short message 5, then the network operator 70 first sends a notice to the first subscriber 60 that informs the subscriber 60 of the makeup and/or content of the short message 5. The first subscriber 60 can then download the short message 5 either partially or entirely from the network operator 70, so that the short message 5 is transmitted partially or completely by the network operator 70 to the first subscriber 60.

In FIG. 2, the makeup of a short message 5 of this kind is shown. The short message 5 is transmitted in a transmission frame 1 from the second subscriber 65 to the network operator 70. The transmission frame 1 includes a first data field 15, a second data field 20, and optionally a third data field 25 and a fourth data field 30. The first data field 15 includes a first ID code 35, which identifies the makeup of the short message 5. in addition, a second ID code 40, which identifies the content of the short message 5, can be provided in the first data field 15. The first ID code 35 and the second ID code 40 can also be combined into a single ID code that identifies the makeup and/or content of the short message 5. Also stored in the first data field 15 are data in a first data format. In the second data field 20, data in a second data format, a different from the first data format, are stored. Data whose data format can differ from the data format of the first data field 15 or the second data field 20, but need not necessarily do so, are also stored in the e optionally present further data fields 25, 30. If more than two data fields are provided in the transmission frame 1, then data in a different formats are stored at least in two of the data fields, but the position of these data fields in the transmission frame 1 does not matter.

Dashed lines in FIG. 2 indicate that the first data field 15 can additionally include a first data-field-specific ID code 45, which identifies the makeup and/or content of the first data field 15. Correspondingly, the second data field can include a second data-field specific ID code 50, which identifies the makeup and/or content of the second data field 20. The third data field 25 can correspondingly include a third data-field-specific ID code 55, which identifies the makeup and/or content of the third data field 25, and the fourth data field 30 can include a fourth data-field specific ID code 75, which identifies the makeup and/or content of the fourth data field 30.

The first ID code 35 can include indications about the number of data fields 15, 20, 25, 30 in the short message 5. In addition or as an alternative, the first ID code 35 can include data about the data formats of the data stored in the data fields 15, 20, 25, 30. In addition or alternatively, indications about the size of the data fields 15, 20, 25, 30 can be included in the first ID code 35. In that case, the second ID code 40 can include indications about the type of the data stored in the data fields 15, 20, 25, 30. For instance, the second ID code 40 can include indications as to whether audio data or image data are stored in a data field.

It can now be provided that the network operator 70, upon the request of the first subscriber 60, will forward the first data field with the first ID code 35 and the second ID code 40 to the first subscriber 60, so that on the basis of the information, transmitted in the first ID code 35 and the second ID code 40, about the makeup and/or content of the short message 5, the first subscriber 60 can check which data fields of the short message 5 it is capable, on the basis of its functionality, of downloading and/or playing back from the network operator 70. Also, in the first subscriber 60, a decision can be made as to which of the readable data fields of the short message 5 are to be downloaded at all from the network operator 70, if not all the readable data fields of the short message 5 are of interest to the first subscriber 60, for the sake of economy of transmission capacity. If by the request of the first subscriber 60 the entire first data field 15 with the first ID code 35 and the second ID code 40 is to be transmitted to the first subscriber 60, then it should as much as possible be assured that the data stored in the first data field 15 are in a data format that is readable by all the subscribers of the telecommunications network 10. this is true particularly whenever the data stored in the first data field 15, together with the data in the first ID code 35 and in the second ID code 40, are in text format; the SMS (Short Message Service) format by the GSM Standard (Global System for Mobile Communications), for instance, is attractive, since it is readable, in a telecommunications network embodied by the requirement of the GSM system, by the subscribers or mobile radio devices of this subscriber that are embodied by the GSM Standard. Then the first data field 15 can correspond to the data field already prescribed for the SMS by the GSM Standard and can be limited in its size to the 160 7-bit ASCII (American Standard Code for information Interchange) text characters. The other data fields 20, 25, 30 need riot be limited in their size.

A further data format for the first data field 15, which is likewise readable, as an alternative to the text format, by all the subscribers of the telecommunications network 10, is the binary encoding of the references to entries in tables of the kind that contain known data formats and are now to all the subscribers of the telecommunications network 10.

At least some of the data stored in the first data field 15, such as the data of the first ID code 35 and/or the data of the second ID code 40, in that case comprise binary-encoded values that represent the indices of the table entries. In the tables, known data types and/or data formats, such as audio and/or video formats, are assigned to these indices.

The data-field-specific ID codes 45, 50, 55, 75 can also include indications about the data formats in the respective associated data field 15, 20, 25, 30 and/or about the size of the respective associated data field 15, 20, 25, 30 and/or about the type of data in the respective data field 15, 20, 25, 30. If it is agreed that the data in the first data field 15 are in the GSM-SMS text format, and this data field is limited for instance to 160 7-bit ASCII text characters, then the first data-field-specific ID code 45 can also be omitted. It can be provided that only data in a single data format are stored in each data field 15, 20, 25, 30. However, it can also be provided that in at least one of the data fields, data in a plurality of data formats are stored, in particular in the second data field 20 and/or optionally in one or more further data fields 25, 30. Naturally, it can also be provided that the snort message 5 includes more than four fields shown in FIG. 2.

It can also be provided that the notice from the network operator 70 to the first subscriber 60, in response to the request by the subscriber to the network operator 70, about the makeup and/or content of the short message 5 is prepared by evaluation of the data-field-specific ID codes 45, 50, 55, 75 and is then sent to the first subscriber 60, so that in this case, the first ID code 35 and the second ID code 40 are not needed, and the first data field 15 does not have to be sent to the first subscriber 60, either. The notice, generated in this way, about the makeup and/or content of the short message 5 can, however, also be sent to the first subscriber 60 in a data format that is readable by all the subscribers of the telecommunications network 10; for that purpose, once again, the GSM-SMS text format using a data field with 160 7-bit ASCII text characters, can for instance be provided in particular.

A concrete example of a transmission frame 1 for a short message 5 will now be described in conjunction with FIG. 3. The short message 5 is embodied as a multimedia short message. FIG. 3d, identical reference numerals identify the same elements as in FIG. 2. According to FIG. 3, the first data field 15, second data field 20 and third data field 25 are provided in the transmission frame 1. No data-field-specific ID codes are provided in the individual data fields 15, 20, 25. The first data field 15 includes text data in the ASCII text format; the second data field 20 includes audio data, for instance in the WAV (Wave) format; and the third data field 25 includes image data, for instance in the GIF format (Graphic Interchange Format). The first data field 15 with the text data is text-formatted in accordance with the GSM-SMS. A dashed line between the first ID code 35 and the second ID code 40 in FIG. 3 indicates that the first ID code 35 and the second ID code 40 in FIG. 3 indicates that the first ID code 35 and the second ID code 40 can be combined into one common ID code. This kind of common ID code 35, 40 indicates both the number of data fields 15, 20, 25 and the content and size of the second data field 20 and third data field 25. Hence the common ID code 35, 40 can look like this:

"Multipart/2/Audio/7654/Image/12345".

This common ID code 35, 40 states that what is involved is a short message from a plurality of data fields, as indicated by the code word "Multipart". The numeral "2" indicates that besides the first data field 15, which is always present, having the text data and a length of 160 7-bit ASCII text characters, there are also two further data fields 20, 25 in the transmission frame 1 of the short message 5. "Audio" is named as the first data type in the common ID code 35, 40; thus the common ID code 35, 40 tells that the data stored in the second data field 20 are audio data. The second data type is named "Image" in the common ID code 35, 40; thus the common ID code 35, 40 tells that the data stored in the third data field 25 are image data. Following the data type in the common ID code 35, 40 is the size of the associated data field 20, 25 in each case, so that the common ID code 35, 40 tells both the length of an audio file having the audio data, transmitted in the second data field 20, which is 7654 bytes and the length of an image file with the image data, transmitted in the third data field 25, which is 12345 bytes. For the first data field 15, no indications are required in the common ID code 35, 40, since in the example described, it always includes text data, which are compatible with the GSM-SMS text format and which are limited in number to 160 7-bit ASCII text characters. Provisions can additionally be made so that the common ID code 35, 40 also indicates the data format for the data in the second data field 20 and in the third data field 25. For the audio data in the second data field 20, the WAV format could then be indicated as a data format in the common ID code 35, 40. For the image data format in the common ID code 35, 40. However, it is also possible that the indications "Audio" and "Image" of the aforementioned common ID code 35, 40 simultaneously describe the content and the format of the data stored in the corresponding data fields 20, 25 as well, in which case it is then a prerequisite that audio data always be present in a predetermined format, such as the WAV format, and image data also always be present in predetermined format, such as the GIF format, in the corresponding data field of the transmission frame 1.

As described, it is also possible to encode the data type and/or the data format by way of tables known to all the subscribers of the telecommunications network 10, for instance by means of a binary code. In a first table for data types, the data type "Text Data" can for instance be assigned a numeral "1", the data type "Audio Data" can be assigned the numeral "2", the data type "Image Data" can be assigned the numeral "3", and the data type "Video Data" can be assigned the numeral "4", and the numerals can be suitably binary-encoded. In a second table for data formats of the data type "Audio Data", the data format "WAV" can for instance be assigned the numeral "1", the data format "G.723" can be assigned the numeral "2", the data format "G.728" can be assigned the numeral "3", the data format "MPEG-Audio" (MPEG stands for Motion Picture Expert Group) can be assigned the numeral "43", and the data format "AMR" (Adaptive Multi Rate) can be assigned the numeral "5"; once again, these numerals can be suitably binary-encoded. In a third table for data formats of the data type "Image Data", the data format "GIF" can for instance be assigned the numeral "1", the data format "JPEG" (Joint Picture Expert Group) can be assigned the numeral "2", and the data format "BMP" (Bitmap) can be assigned the numeral "3", and again these numerals can be suitably binary-encoded.

In that case, the common ID code 35, 40 could look like this:

2/2/1/3/1

This common ID code 35, 40 makes the same statement as the one describe above in text format. Here the first numeral "2" of the common ID code 35, 40 stands for the number of data fields present, in addition to the first data field 15, in the transmission frame 1 of the short message 5. The second numeral "2" of the common ID code 35, 40 refers, within the first table for data types, to the data type "Audio Data" and thus states that audio data are stored in the second data field 20. The third numeral "1" in the common ID code 35, 40 refers within the second table for data formats of the data type "Audio Data" to the "WAV" data format and states that the data stored in the second data field 20 are in the "WAV" data format. The fourth numeral "3" of the common ID code 35, 40 refer within the first table for data types to the data type "Image Data" and thus states that image data are stored in the third data field 25.

The fifth numeral "1" in the common ID code 35, 40 refers within the third table for data formats of the data type "Image Data" to the "GIF" data format and states that the data stored in the third data field 25 are in the "GIF" data format.

Based on the common ID code 35, 40 transmitted to the first subscriber 60, a decision can be made in the first subscriber whether it makes sense at all or is wanted to download the second data field 20 and/or the third data field 25 from the network operator 70. If the first subscriber 6 lacks audio capacity, or in other words has no capacity of processing or playing back audio data field 20 from the network operator 70. If the first subscriber 60 has no image capability, that is, image data can not be processed or played back in the first subscriber 60, then again it makes no sense to download image data from the third data field 25 from the network operator 70.

For selecting the data fields of the transmission frame 1 of the short message 5 that are to be downloaded from the network operator 70, provision can be made for displaying the common ID code 35, 40 on a display device of the second subscriber 60.

The short message 5 could also include a transmission frame 1 comprising precisely two data fields 15, 20; in the first data field 15, the text data with the common ID code 35, 40 are then present, as described, while in the second data field 20, a plurality of data types or media are combined. However, it can also be provided that N data types or media, to be transmitted in the short message 5, are distributed N or N+1 data fields in the transmission frame 1 of the short message 5. In that case, the first subscriber 60 can download all the data fields of the short message 5 from the network operator 70 either individually or all network operator 70 are also connected by landline. Provision can also be made for one of the two subscribers 60, 65 to be in communication via a landline telecommunications network 10, and for the other of the two subscribers 60, 65 to be in communication via a wireless telecommunications network 10, with the short messages 5 both in the landline telecommunications network and the wireless telecommunications network 10.

It will be understood that each of the elements described above, or two or more together, may also find a useful application in other types of constructions differing from the type described above.

While the invention has been illustrated and described as embodied in transmission frame and radio unit with transmission frame, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a radio telecommunications network providing service to a subscriber device, a method, comprising:
    receiving a message at the subscriber device before delivery of a short messaging service (SMS) message to the subscriber device that the SMS message contains textual data and at least one of image data or audio data;
    sending from the subscriber device a request that only a portion of the SMS message be forwarded to the subscriber device; and
    receiving only a portion of the SMS message at the subscriber device based on the request.

2. The method of claim 1, wherein the receiving only a portion of the SMS message comprises receiving only the textual data contained in the SMS message.

3. The method of claim 1, wherein the SMS message contains image data and wherein the receiving only a portion of the SMS message comprises receiving the image data of the SMS message.

4. The method of claim 1, wherein the SMS message contains audio data and wherein the receiving only a portion of the SMS message comprises receiving the audio data of the SMS message.

5. The method of claim 1, wherein the SMS message contains image data and the subscriber device contains no image capability, and wherein the receiving comprises receiving the SMS message without the image data.

6. The method of claim 1, wherein the SMS message contains audio data and the subscriber device contains no audio capability, and wherein the receiving only a portion of the SMS message comprises receiving the SMS message without the audio data.

7. In a radio telecommunications network, a method, comprising the steps:
    receiving a first short messaging service (SMS) message at a subscriber device informing the subscriber device that a second SMS message having textual content and non-textual media content is available for download;
    sending a request to download the second SMS message to the subscriber device;
    receiving the second SMS message with only one of the textual content and non-textual media content at the subscriber device.

8. The method of claim 7, wherein the non-textual media content comprises audio content.

9. The method of claim 7, wherein the non-textual media content comprises image content.

10. A telecommunications device configured to perform the method of claim 1.

11. A telecommunications device configured to perform the method of claim 7.

* * * * *